United States Patent
Migita et al.

(10) Patent No.: US 9,724,998 B2
(45) Date of Patent: Aug. 8, 2017

(54) ELECTRIC VEHICLE AND INSULATION STATE DETERMINATION METHOD FOR ELECTRIC VEHICLE

(71) Applicants: Tsubasa Migita, Toyota (JP); Mitsuyori Matsumura, Seto (JP)

(72) Inventors: Tsubasa Migita, Toyota (JP); Mitsuyori Matsumura, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 739 days.

(21) Appl. No.: 14/153,274

(22) Filed: Jan. 13, 2014

(65) Prior Publication Data

US 2014/0197683 A1    Jul. 17, 2014

(30) Foreign Application Priority Data

Jan. 15, 2013    (JP) .................................. 2013-004568

(51) Int. Cl.
*G01R 31/12* (2006.01)
*B60R 16/02* (2006.01)
(Continued)

(52) U.S. Cl.
CPC ............ *B60L 11/14* (2013.01); *B60L 3/0046* (2013.01); *B60L 3/0069* (2013.01); *B60L 3/04* (2013.01);
(Continued)

(58) Field of Classification Search
CPC ...... B60L 11/14; B60L 11/123; B60L 15/007; B60L 15/20; B60L 3/04; B60L 3/0069;
(Continued)

(56) References Cited

U.S. PATENT DOCUMENTS 8,682,520 B2 * 3/2014 Yamada .................. B60L 3/003
701/22
8,847,605 B2 * 9/2014 Morita .................. B60L 3/0023
324/509

(Continued)

FOREIGN PATENT DOCUMENTS

JP    2005-304138 A    10/2005
JP    2008-029165 A    2/2008
(Continued)

*Primary Examiner* — Jared Fureman
*Assistant Examiner* — Emmanuel R Dominique
(74) *Attorney, Agent, or Firm* — Dinsmore & Shohl LLP

(57) ABSTRACT

Provided is an electric vehicle including an electric system that generates drive power, a detector, and a controller. The electric system includes a power storage device, a drive device that uses power of the power storage device to generate drive power, a first relay provided between the positive electrode of the power storage device and the drive device, and a second relay provided between the negative electrode of the power storage device and the drive device. The detector is electrically connected to the power storage device and detects an insulation abnormality in the electric system. The controller determines the insulation state of the electric system on the basis of a detection result of the detector obtained when the first relay and the second relay are open and a detection result of the detector obtained when either of the first relay and the second relay is thereafter closed.

11 Claims, 7 Drawing Sheets

(51) Int. Cl.
*B60L 11/14* (2006.01)
*B60L 3/00* (2006.01)
*B60L 3/04* (2006.01)
*B60L 11/00* (2006.01)
*B60L 11/12* (2006.01)
*B60L 15/00* (2006.01)
*B60L 15/20* (2006.01)

(52) U.S. Cl.
CPC ............ *B60L 11/005* (2013.01); *B60L 11/123* (2013.01); *B60L 15/007* (2013.01); *B60L 15/20* (2013.01); *B60L 2210/14* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/547* (2013.01); *B60L 2240/549* (2013.01); *B60L 2260/26* (2013.01); *B60L 2270/20* (2013.01); *Y02T 10/6217* (2013.01); *Y02T 10/645* (2013.01); *Y02T 10/7022* (2013.01); *Y02T 10/7077* (2013.01); *Y02T 10/7225* (2013.01); *Y02T 10/7241* (2013.01); *Y02T 10/7275* (2013.01)

(58) Field of Classification Search
CPC ............... B60L 3/0046; B60L 11/005; B60L 2240/423; B60L 2240/549; Y02T 10/645; Y02T 10/7022; Y02T 10/6217; Y02T 10/7241; Y02T 10/7225; Y02T 10/7275
See application file for complete search history.

(56) References Cited

U.S. PATENT DOCUMENTS

| | | | | |
|---|---|---|---|---|
| 2003/0214306 | A1* | 11/2003 | Beutelschiess | B60L 3/00 324/511 |
| 2004/0189330 | A1* | 9/2004 | Herb | G01R 27/18 324/691 |
| 2009/0134881 | A1* | 5/2009 | Tachizaki | B60L 3/0023 324/551 |
| 2010/0063660 | A1* | 3/2010 | Uchida | B60W 20/15 701/22 |
| 2010/0296204 | A1* | 11/2010 | Ichikawa | B60K 6/445 361/15 |
| 2011/0049977 | A1* | 3/2011 | Onnerud | B60L 3/0046 307/9.1 |
| 2014/0002091 | A1* | 1/2014 | Edamura | E02F 9/123 324/418 |

FOREIGN PATENT DOCUMENTS

| | | |
|---|---|---|
| JP | 2008-167617 A | 7/2008 |
| JP | 2011-062003 A | 3/2011 |
| JP | 2011-155743 A | 8/2011 |
| JP | WO-2012128133 A1 * | 9/2012 |
| JP | 2012-202723 A | 10/2012 |

* cited by examiner

ELECTRIC VEHICLE AND INSULATION STATE DETERMINATION METHOD FOR ELECTRIC VEHICLE

INCORPORATION BY REFERENCE

The disclosure of Japanese Patent Application No. 2013-004568 filed on Jan. 15, 2013 including the specification, drawings and abstract is incorporated herein by reference in its entirety.

BACKGROUND OF THE INVENTION

1. Field of the Invention

The invention relates to an electric vehicle and to an insulation state determination method for an electric vehicle, and more particularly to a technique for determining the insulation state of an electric system that generates drive power.

2. Description of Related Art

Japanese Patent Application Publication No. 2008-167617 (JP 2008-167617 A) discloses a vehicle equipped with a detector that detects a decrease in insulation resistance of a drive device generating drive power. In this vehicle, the insulation decrease site is determined on the basis of a detection result obtained by the detector when the vehicle is stopped. Further, a rotary electric machine which is to be allowed to operate in the next running cycle is determined, from among a plurality of rotary electric machines, according to the insulation decrease site (see JP 2008-167617 A).

In JP 2008-167617 A, the system main relay is controlled when the insulation decrease site is specified, but how the system main relay is controlled is not specifically described.

SUMMARY OF THE INVENTION

Where the system main relay is only controlled from the ON state to the OFF state, the insulation decrease site can be determined erroneously. Where the system main relay on the positive electrode side and the system main relay on the negative electrode side are switched ON simultaneously in order to specify the insulation decrease site, it is necessary to implement the pre-charge processing for preventing a rush current or discharge processing when the system main relay is switched OFF again. Further, the fusion check of the system main relay could also be required. As a result, the entire processing time is extended.

The invention provides an electric vehicle and an insulation state determination method for an electric vehicle such that the insulation abnormality determination accuracy can be increased and the processing time can be shortened.

According to a first aspect of the invention, an electric vehicle includes an electric system configured to generate drive power, a detector configured to detect an insulation abnormality in the electric system, and a controller. The electric system includes a power storage device, a drive device, a first relay, and a second relay. The drive device is configured to use power of the power storage device to generate drive power. The first relay is provided between the positive electrode of the power storage device and the drive device. The second relay is provided between the negative electrode of the power storage device and the drive device. The detector is electrically connected to the power storage device. The controller is configured to determine an insulation state of the electric system on the basis of the detection result of the detector obtained when the first relay and the second relay are open and the detection result of the detector obtained when either of the first relay and the second relay is thereafter closed.

In the electric vehicle, the controller may be configured to determine the insulation state of the electric system on the basis of a detection result of the detector obtained when the first relay and the second relay are open and a detection result of the detector obtained when the first relay is thereafter closed.

In the electric vehicle, the controller may be configured to determine that an insulation state of the electric system is indefinite when opening of the first relay and the second relay changes a detection result of the detector from abnormal to normal and the detection result of the detector indicates a normal state even when either of the first relay and the second relay is thereafter closed.

In the electric vehicle, the controller may be configured to determine that an insulation resistance of the drive device has decreased when opening of the first relay and the second relay changes a detection result of the detector from abnormal to normal and the detection result of the detector indicates an abnormal state as a result of either of the first relay and the second relay being thereafter closed.

In the electric vehicle, the controller may be configured to determine that an insulation resistance of the power storage device has decreased when a detection result of the detector indicates an abnormal state when the first relay and the second relay are open.

In the electric vehicle, the detector may include a resistor element, an alternating current (AC) power source, a capacitor, and a voltage detection unit. The AC power source may be electrically connected between the resistor element and a vehicle ground and may generate an AC voltage of a predetermined frequency. The capacitor may be electrically connected between the resistor element and the power storage device. The voltage detection unit may detect a voltage component with the predetermined frequency in a power line between the resistor element and the capacitor.

A second aspect of the invention resides in an insulation state determination method for an electric vehicle. The electric vehicle includes an electric system that generates drive power and a detector for detecting an insulation abnormality of the electric system. The electric system includes a power storage device, a drive device, and first and second relays. The drive device generates drive power by using power of the power storage device. The first relay is provided between the positive electrode of the power storage device and the drive device. The second relay is provided between the negative electrode of the power storage device and the drive device. The detector is electrically connected to the power storage device. The insulation state detection method includes: opening the first relay and the second relay, closing either of the first relay and the second relay after the first relay and the second relay have been opened, and determining an insulation state of the electric system on the basis of a detection result of the detector obtained when the first relay and the second relay are open, and a detection result of the detector obtained when either of the first relay and the second relay is closed.

In the insulation state determination method for an electric vehicle, an insulation state of the electric system may be determined on the basis of a detection result of the detector obtained when the first relay and the second relay are open and a detection result of the detector obtained when the first relay is closed.

With the above-described configuration, the insulation state of the electric system is determined by using not only the detection result of the detector obtained when the first and second relays are open, but also the detection result of the detector obtained when either of the first and second relays is thereafter closed. As a result, the determination accuracy is increased by comparison with the case in which the insulation state is determined by using only the former detection result. Further, since either of the first and second relays is closed, instead of closing both the first relay and the second relay, the pre-charge processing, discharge processing, and relay fusion check are unnecessary. Therefore, with the above-described configuration, it is possible to increase the insulation abnormality determination accuracy and also shorten the processing time.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
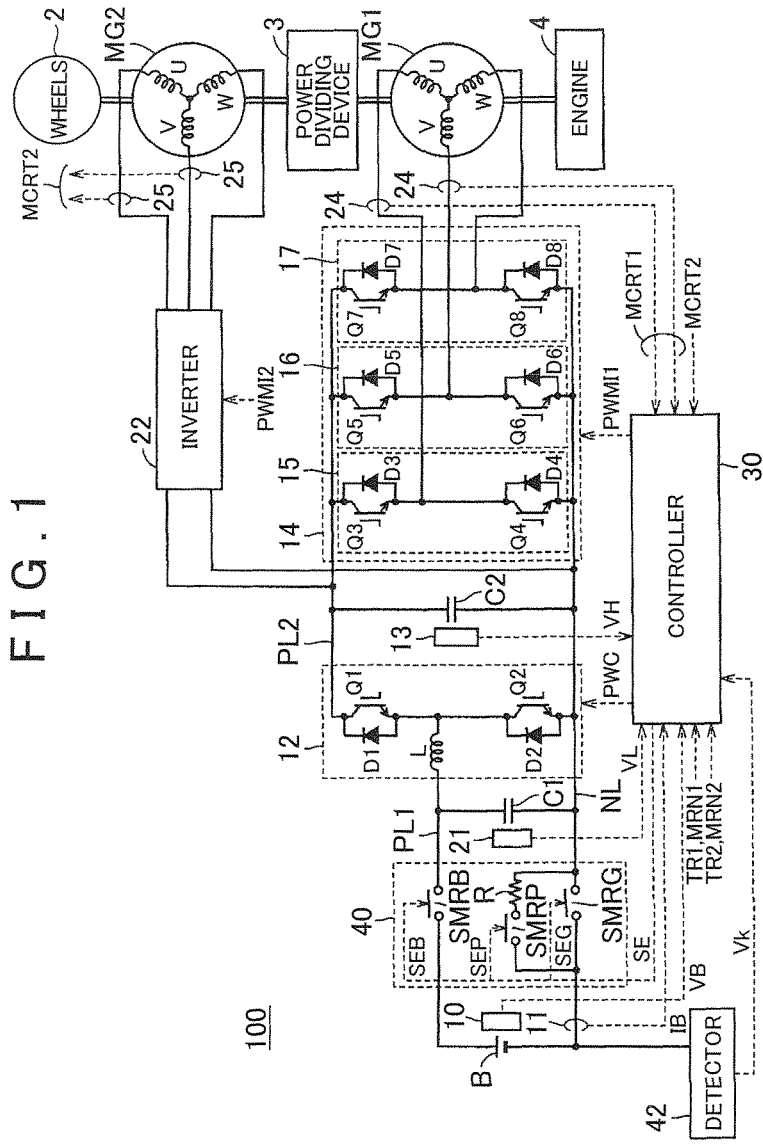
FIG. 1 is a configuration diagram of the entire hybrid vehicle described as an example of the electric vehicle according to an embodiment of the invention.

The embodiments of the invention will be described below in greater detail with reference to the appended drawings. In the drawings, like or corresponding components are assigned with like reference numerals and the explanation thereof is herein omitted.

FIG. 1 is a configuration diagram of the entire hybrid vehicle described as an example of the electric vehicle according to an embodiment of the invention. Referring to FIG. 1, a hybrid vehicle 100 is provided with an electric system including a power storage device B, a system main relay (also referred to hereinbelow as SMR) 40, a boost converter 12, inverters 14, 22, motor generators MG1, MG2, positive electrode lines PL1, PL2, a negative electrode line NL, and smoothing capacitors C1, C2. The hybrid vehicle 100 is also provided with an engine 4, a power dividing device 3, wheels 2, a controller 30, a detector 42, voltage sensors 10, 13, 21, and current sensors 11, 24, 25.

The hybrid vehicle 100 carries the motor generators MG1, MG2 and the engine 4 as drive sources. The engine 4, the motor generator MG1, and the drive shaft of the wheels 2 are connected to the power dividing device 3. The power generated by the engine 4 is divided by the power dividing device 3 into two paths. Specifically, the power is transmitted to the drive shaft of the wheels 2 by one path and to the motor generator MG1 by the other path.

The motor generator MG1 mainly operates as a generator driven by the engine 4 and is also incorporated in the hybrid vehicle 100 for operating as a start motor for the engine 4. The motor generator MG2 is connected to the drive shaft of the wheels 2 and incorporated in the hybrid vehicle 100 as a motor for driving the wheels 2. A reducer may be incorporated between the motor generator MG2 and the drive shaft of the wheels 2.

The power dividing device 3 is constituted by a planetary gear including a sun gear, a pinion gear, a carrier, and a ring gear. The pinion gear is meshed with the sun gear and the ring gear. The carrier rotatably supports the pinion gear and is connected to the crankshaft of the engine 4. The sun gear is connected to the rotating shaft of the motor generator MG1. The ring gear is connected to the drive shaft (rotating shaft of the motor generator MG2) of the wheels 2.

The power storage device B is a rechargeable direct-current (DC) battery. The power storage device B is constituted, for example, by a secondary battery such as a nickel hydride battery or a lithium ion battery, or an electric double layer capacitor. The power storage device B stores power to be supplied to the motor generators MG1, MG2. Further, when the motor generators MG1, MG2 generate power, the power storage device B is charged by receiving DC power outputted from the boost converter 12 to the positive electrode line PL1.

The SMR 40 is provided between the power storage device B and the boost converter 12. The SMR 40 includes relays SMRB, SMRP, SMRG and a resistor R. The relay SMRB is connected between the positive electrode of the power storage device B and the positive electrode line PL1. The relay SMRG is connected between the negative electrode of the power storage device B and the negative electrode line NL. The relay SMRP and the resistor R are connected is series with each other and connected in parallel with the relay SMRG. The relays SMRB, SMRP, SMRG are ON/OFF switched in response to signals SEB, SEP, SEG, respectively, from the controller 30.

The relay SMRP and the resistor R form a pre-charge circuit for preventing a rush current from flowing from the power storage device B to the smoothing capacitors C1, C2. Thus, the relay SMRP is switched ON and the smoothing capacitors C1, C2 are pre-charged, while restricting the current with the capacitor R, before the relays SMRB and SMRG are switched ON. As a result, the rush current is prevented from flowing when the relays SMRB, SMRG are switched ON.

The boost converter 12 is provided between the power storage device B and the inverters 14, 22. The boost converter 12 includes a reactor L, power semiconductor switching elements (referred to hereinbelow also as switching elements) Q1, Q2, and diodes D1, D2. The switching elements Q1, Q2 are connected in series between the positive electrode line PL2 and the negative electrode line NL. The diodes D1, D2 are connected in reverse parallel to the switching elements Q1, Q2, respectively. One end of the reactor L is connected to the positive electrode line PL1, and the other end is connected to the connection node of the switching elements Q1, Q2.

For example, insulated gate bipolar transistors (IGBT), bipolar transistors, metal oxide semiconductor field effect transistors (MOSFET), and gate turn-off thyristors (GTO) can be used for the switching elements Q1, Q2 and the below-described switching elements Q3 to Q8 used in the inverters 14, 22.

The boost converter 12 boosts the voltage of the positive electrode line PL2 to or higher than the output voltage of the power storage device B by switching ON/OFF the switching elements Q1, Q2 in response to a signal PWC from the controller 30. More specifically, the boost converter 12 boosts the voltage of the positive electrode line PL2 by storing the electric current flowing when the switching element Q2 is ON as magnetic field energy in the reactor L and releasing the stored energy to the positive electrode line PL2 via the diode D1 when the switching element Q2 is OFF.

The inverters 14, 22 are provided correspondingly to motor generators MG1, MG2, respectively. The inverter 14 includes a U phase arm 15, a V phase arm 16, and a W phase arm 17. The U phase arm 15, the V phase arm 16, and the W phase arm 17 are connected in parallel between the positive electrode line PL2 and the negative electrode line NL.

The U phase arm 15 includes the switching elements Q3, Q4 and the diodes D3, D4. The switching elements Q3, Q4 are connected in series between the positive electrode line PL2 and the negative electrode line NL. The diodes D3, D4 are connected in reverse parallel to the switching elements Q3, Q4, respectively. A U phase coil of the motor generator MG1 is connected to the connection node of the switching elements Q3, Q4.

The V phase arm 16 includes the switching elements Q5, Q6 and the diodes D5, D6. The switching elements Q5, Q6 are connected in series between the positive electrode line PL2 and the negative electrode line NL. The diodes D5, D6 are connected in reverse parallel to the switching elements Q5, Q6, respectively. A V phase coil of the motor generator MG1 is connected to the connection node of the switching elements Q5, Q6.

The W phase arm 17 includes the switching elements Q7, Q8 and the diodes D7, D8. The switching elements Q7, Q8 are connected in series between the positive electrode line PL2 and the negative electrode line NL. The diodes D7, D8 are connected in reverse parallel to the switching elements Q7, Q8, respectively. A W phase coil of the motor generator MG1 is connected to the connection node of the switching elements Q7, Q8.

Similarly to the inverter 14, the inverter 22 is also connected to the positive electrode line PL2 and the negative electrode line NL and includes a U phase arm, a V phase arm and a W phase arm (not shown in the figure). The U phase arm, V phase arm, and W phase arm of the inverter 22 are connected to a U phase coil, a V phase coil, and a W phase coil, respectively, of the motor generator MG2.

The inverter 14 converts the AC power generated by the motor generator MG1 by using the output of the engine 4 into DC power on the basis of a signal PWMI1 from the controller 30 and outputs the converted DC power to the positive electrode line PL2. The inverter 22 converts the DC power received from the positive electrode line PL2 into AC power on the basis of a signal PWMI2 from the controller 30 and outputs the converted AC power to the motor generator MG2.

The motor generators MG1, MG2 are each an AC electric machine constituted, for example, by an AC synchronous motor of a permanent magnet type in which a permanent magnet is embedded in a rotor. The motor generator MG1 generates AC power by using power of the engine 4 received via the power dividing device 3, and outputs the generated AC power to the inverter 14. The motor generator MG2 generates a torque for driving the wheels 2 by using the AC power received from the inverter 22.

The smoothing capacitor C1 is electrically connected between the positive electrode line PL1 and the negative electrode line NL and smoothes the AC component of voltage fluctuations between the positive electrode line PL1 and the negative electrode line NL. The smoothing capacitor C2 is electrically connected between the positive electrode line PL2 and the negative electrode line NL and smoothes the AC component of voltage fluctuations between the positive electrode line PL2 and the negative electrode line NL.

The detector 42 is a device for detecting an insulation abnormality in the electric system (includes the power storage device B, SMR 40, boost converter 12, inverters 14, 22, and motor generators MG1, MG2). The detector 42 is electrically connected to the negative electrode (on the power storage device B side other than that of the SMR 40) of the power storage device B. As described hereinbelow, the detector 42 applies an AC voltage of a predetermined frequency to the electric system, generates a voltage value Vk that decreases correspondingly to the insulation decrease in the electric system, and outputs the generated voltage value to the controller 30. The configuration of the detector 42 is described below.

The voltage sensor 10 detects a voltage VB of the power storage device B and outputs the detection value to the controller 30. The current sensor 11 detects a current IB inputted to and outputted from the power storage device B and outputs the detection value to the controller 30. The voltage sensor 21 detects a voltage between the terminals of the smoothing capacitor C1, that is, a voltage VL between the positive electrode line PL1 and the negative electrode line NL, and outputs the detection value to the controller 30. The voltage sensor 13 detects a voltage between the terminals of the smoothing capacitor C2, that is, a voltage VH between the positive electrode line PL2 and the negative electrode line NL, and outputs the detection value to the controller 30. The current sensor 24 detects a current MCRT1 flowing in the motor generator MG1, and outputs the detection value to the controller 30. The current sensor 25 detects a current MCRT2 flowing in the motor generator MG2, and outputs the detection value to the controller 30.

The controller 30 controls the SMR 40, boost converter 12, inverters 14, 22, and engine 4 by software processing, that is, by executing with a central processing unit (CPU) a program that has been stored in advance, and/or hardware processing performed by an electronic circuit.

The controller 30 also receives the voltage value Vk from the detector 42. The controller 30 determines the insulation state (presence or absence of decrease in insulation resistance) of the electric system on the basis of the voltage value Vk detected when the SMR 40 is switched from the ON state to the OFF state (for example, when the vehicle system is stopped) and then the voltage value Vk detected when only the relay SMRB on the positive electrode side is ON. The configuration (functional configuration) of the controller 30 is described below in greater detail.

Figure 2:
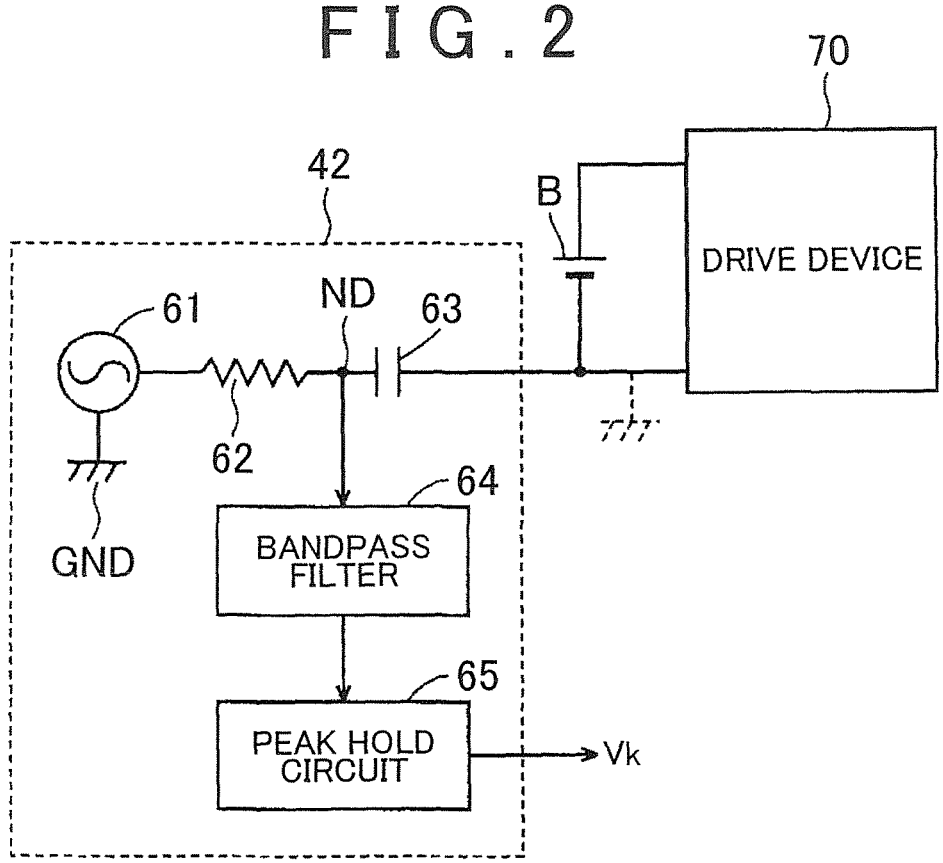
FIG. 2 shows the configuration of the detector shown in FIG. 1.

FIG. 2 shows the configuration of the detector 42 shown in FIG. 1. Referring to FIG. 2, the detector 42 includes an AC power source 61, a resistor element 62, a capacitor 63, a bandpass filter 64, and a peak hold circuit 65.

The AC power source 61 and the resistor element 62 are connected in series between a node ND and the vehicle ground GND (vehicle chassis). The capacitor 63 is connected between the node ND and the negative electrode of the power storage device B. The entire circuit on the side of the boost converter 12 that is opposite that of the SMR 40 shown in FIG. 1 is shown as a drive device 70 in FIG. 2. More specifically, the drive device 70 includes the boost converter 12, the inverters 14, 22, and the motor generators MG1, MG2.

The AC power source 61 outputs a low-frequency AC voltage, for example, an AC voltage of 0 to 5 V with a frequency of 2.5 Hz. The bandpass filter 64 is connected to the node ND, extracts the frequency component (for example, 2.5 Hz) of the AC voltage outputted by the AC power source 61, and outputs the extracted component to the peak hold circuit 65. The peak hold circuit 65 holds the peak of the AC voltage received from the bandpass filter 64, and outputs the held voltage value Vk to the controller 30. The voltage value Vk decreases when an insulation abnormality (decrease in insulation resistance) occurs in the electric system connected to the detector 42.

Figure 3:
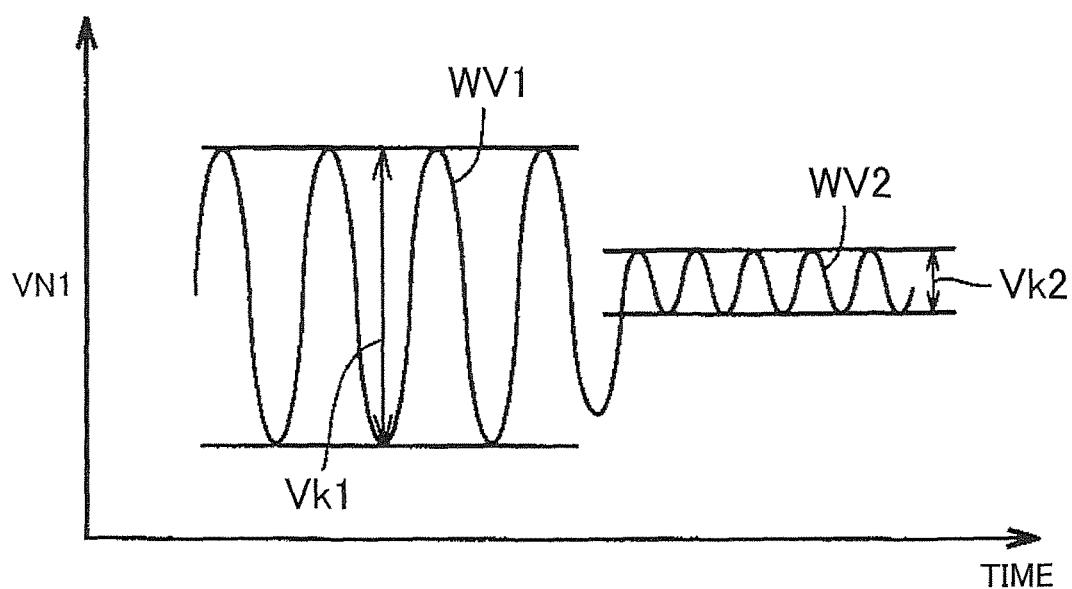
FIG. 3 explains a method for detecting an insulation abnormality with the detector shown in FIG. 2.

FIG. 3 illustrates a method for detecting an insulation abnormality with the detector 42 shown in FIG. 2. Referring to FIG. 2 and also FIG. 3, an AC voltage VN1 is the AC voltage outputted from the bandpass filter 64. A waveform WV1 is the waveform of the AC voltage VN1 observed when no insulation abnormality (decrease in insulation resistance) has occurred in the power storage device B and the drive device 70. A waveform WV2 is the waveform of the AC voltage VN1 observed when an insulation abnormality occurs in at least either of the power storage device B and the drive device 70.

The peak hold circuit 65 outputs a voltage value Vk1 between the peaks as the voltage value Vk to the controller 30 when the AC voltage VN1 has the waveform WV1. Further, when the AC voltage VN1 has the waveform WV2, the peak hold circuit 65 outputs a voltage value Vk2 (<Vk1) between the peaks as the voltage value Vk to the controller 30. By providing an appropriate threshold that makes it possible to distinguish between the voltage value Vk1 and the voltage value Vk2, it is possible to detect the insulation abnormality of the electric system on the basis of the voltage value Vk.

Figure 4:
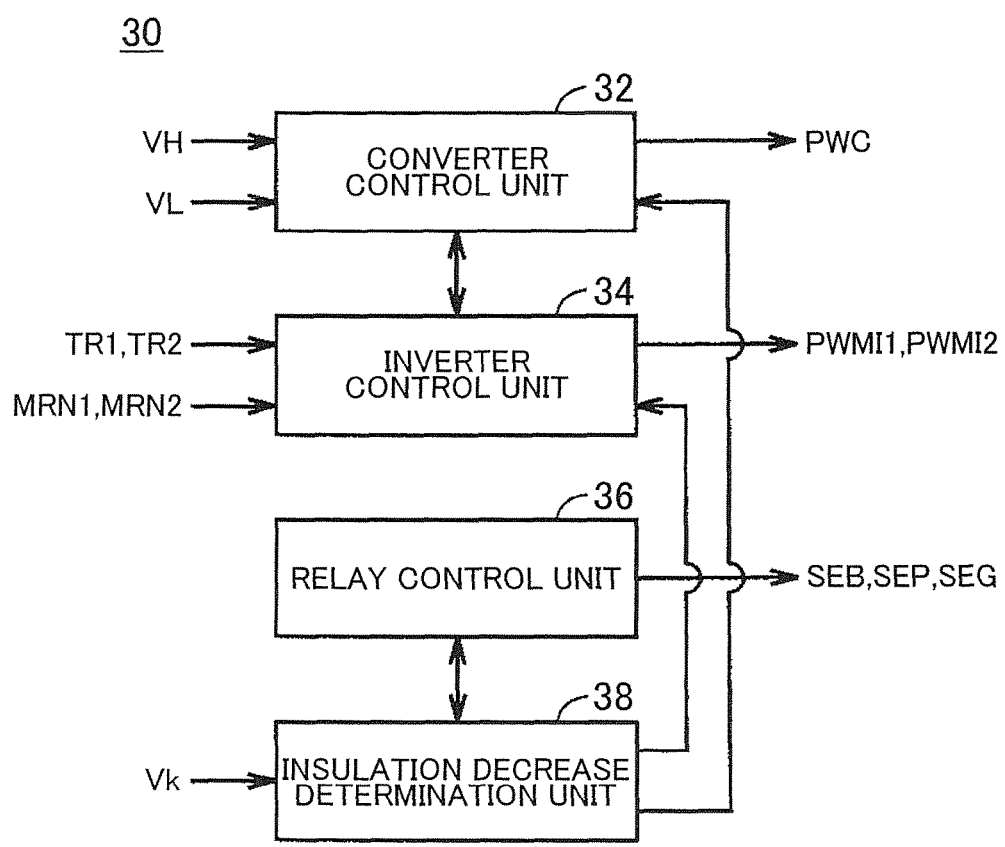
FIG. 4 is a functional block diagram illustrating functionally the configuration of the controller shown in FIG. 1.

FIG. 4 is a functional block diagram illustrating functionally the configuration of the controller 30 shown in FIG. 1. Referring to FIG. 1 together with FIG. 4, the controller 30 includes a converter control unit 32, an inverter control unit 34, a relay control unit 36, and an insulation decrease determination unit 38.

The converter control unit 32 generates the signal PWC for driving the boost converter 12 so that the voltage VH detected by the voltage sensor 13 becomes a predetermined target value. The target value of the voltage VH is determined on the basis, for example, of torque command values TR1, TR2 of the motor generators MG1, MG2. The converter control unit 32 generates the signal PWC for switching ON/OFF the switching elements Q1, Q2 of the boost converter 12 according to the command from the insulation decrease determination unit 38.

The inverter control unit 34 generates the signal PWMI1 for driving the inverter 14 on the basis of the torque command value TR1 of the motor generator MG1 and a motor revolution speed MRN1. Likewise, the inverter control unit 34 generates the signal PWMI2 for driving the inverter 22 on the basis of the torque command value TR2 of the motor generator MG2 and the motor revolution speed MRN2. Further, the inverter control unit 34 also generates the signals PWMI1, PWMI2 for Switching ON/OFF the switching elements of the inverters 14, 22 according to the command from the insulation decrease determination unit 38.

The relay control unit 36 generates the signals SEB, SEP, SEG for driving the relays SMRB, SMRP, SMRG, respectively, so that the relays SMRB, SMRP, SMRG of the SMR 40 perform predetermined ON/OFF operations when the vehicle system is started or stopped (for example, when the ignition switch or start switch is switched ON or OFF). Further, the relay control unit 36 generates the signal SEB for switching ON/OFF the relay SMRB on the positive electrode side according to a command from the insulation decrease determination unit 38.

The insulation decrease determination unit 38 determines the insulation state of the electric system on the basis of the voltage value Vk received from the detector 42. The insulation decrease determination unit 38 then specifies a side (region) of the electric system where the insulation decrease has occurred.

Figure 5:
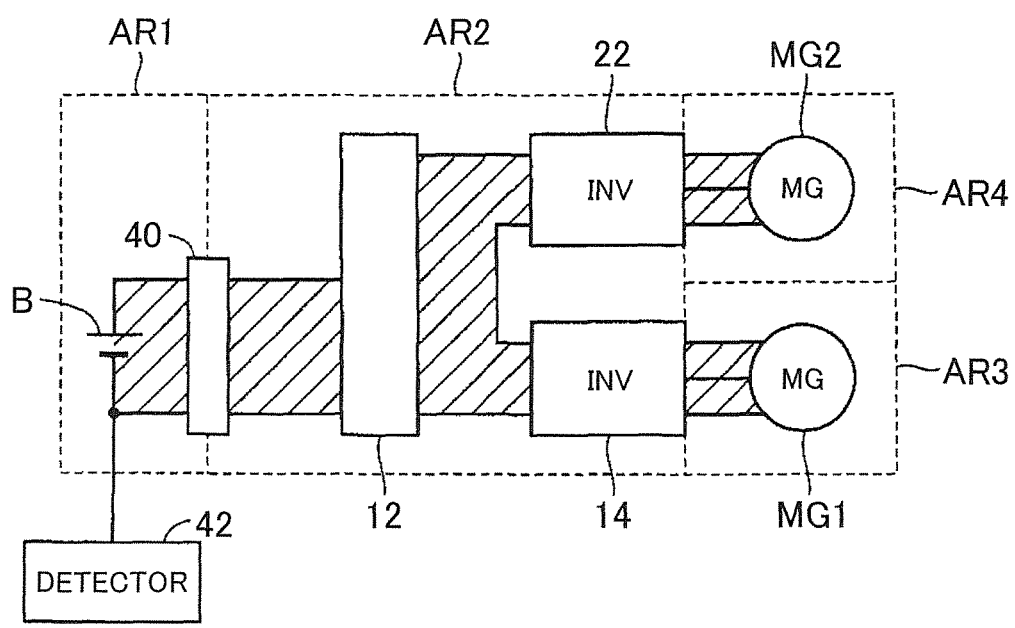
FIG. 5 explains the insulation decrease site that can be specified by the detector of the present embodiment.

FIG. 5 serves to explain the insulation decrease site that can be specified by the detector 42. Referring to FIG. 5, the electric system of the hybrid vehicle 100 is divided into regions AR1 to AR4. The region AR1 includes the power storage device B. The region AR2 includes the boost converter 12 and the inverters 14, 22. The regions AR3, AR4 include the motor generators MG1, MG2, respectively. The SMR 40 is positioned on the boundary of the region AR1 and the region AR2.

In the description below, the regions AR1 to AR4 are also referred to as "battery area AR1", "DC area AR2", "MG1 area AR3", and "MG2 area AR4".

Returning again to FIG. 4, the insulation decrease determination unit 38 determines whether or not an insulation abnormality (insulation decrease) has occurred in the battery area AR1 on the basis of the voltage value Vk observed when the SMR 40 is switched ON/OFF (this determination processing is also referred to hereinbelow as "SMR check"). The SMR check is implemented, for example, when the vehicle system is stopped in the case in which an insulation abnormality of the electric system is detected by the decrease in the voltage value Vk in the ON state of the SMR 40 (for example, when the vehicle runs).

More specifically, where the voltage value Vk remains in the abnormal range (remains decreased) even when the SMR 40 is switched OFF as the vehicle system is stopped, the insulation decrease determination unit 38 determines that an insulation abnormality has occurred in the battery area AR1. Meanwhile, where the voltage value Vk returns (rises) to the normal range as the SMR 40 is switched OFF, it cannot be immediately determined that an insulation abnormality has occurred in a region outside the battery area AR1.

In other words, when the insulation state of the battery area AR1 returns to the normal range at a timing at which the SMR 40 is switched OFF or immediately thereafter, it can be erroneously determined that an insulation abnormality has occurred in a region other than the battery area AR1 (at least one region from among the regions AR2 to AR4), although the insulation abnormality has actually occurred in the battery area AR1. Such erroneous determination can result in unnecessary replacement of the boost converter 12 and inverters 14, 22, or the motor generators MG1, MG2, and should be avoided if possible.

Accordingly, in the present embodiment, after the SMR 40 has been switched OFF as the vehicles was stopped, the SMR 40 is switched ON again and variations in the voltage value Vk are checked in order to avoid such an erroneous determination. Further, where the voltage value Vk decreases as the SMR 40 is switched ON, it is determined that an insulation abnormality has occurred in the region outside the battery area AR1.

In this case, where the SMR 40 is switched ON on both the positive electrode side and the negative electrode side, the pre-charge processing should be performed to prevent a rush current from flowing from the power storage device B to the smoothing capacitors C1, C2. Further, the discharge processing for discharging the electric charges accumulated in the smoothing capacitors C1, C2 or the fusion check of the SMR 40 are also necessary and the SMR check processing time is extended. Accordingly, in the present embodiment, only either one of the relays SMRB on the positive electrode side and the relay SMRG (or relay SMRP) on the negative electrode side is switched ON, instead of switching ON the SMR 40 on both the positive electrode side and the negative electrode side. In the present embodiment, only the relay SMRB is switched ON.

Figure 6:
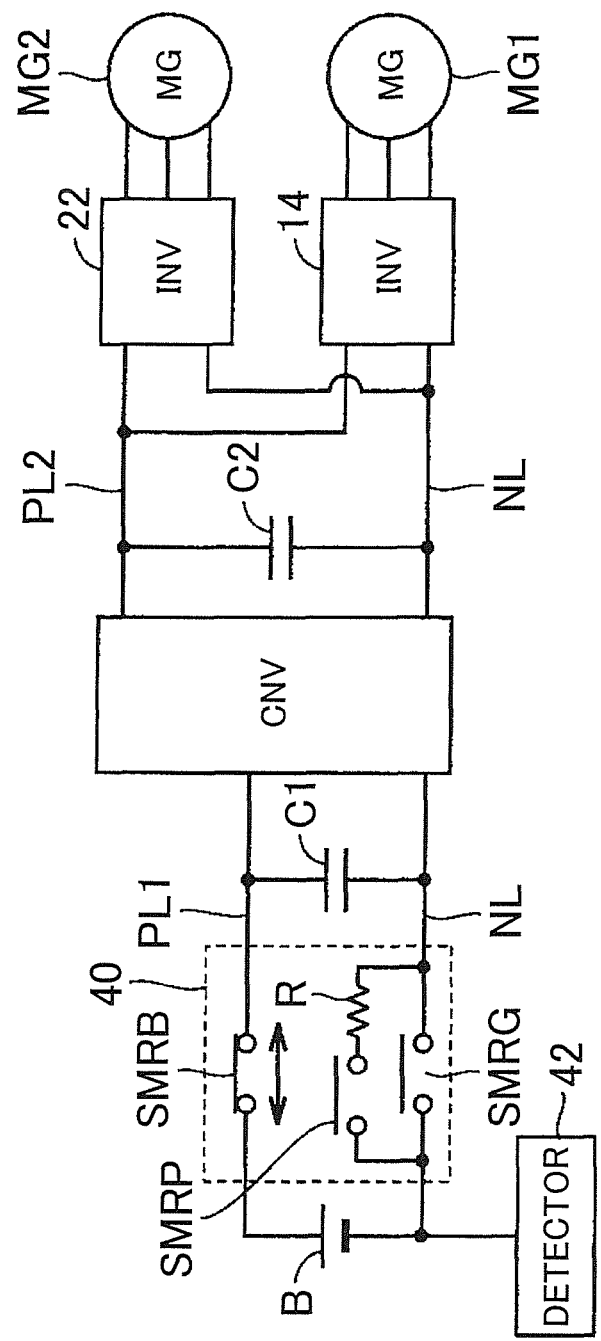
FIG. 6 is a schematic diagram of the electric system of the embodiment.

Since only the relay SMRB on the positive electrode side is switched ON and the relays SMRG, SMRP on the negative electrode side are switched OFF, as shown in FIG. 6, the power stored in the power storage device B does not flow to the smoothing capacitors C1, C2. Therefore, it is not necessary to perform the pre-charge processing, discharge processing, and SMR fusion check. Meanwhile, as a result of the relay SMRB being switched ON, the output of the detector 42 can be supplied via the relay SMRB to the boost converter 12, the inverters 14, 22, and the motor generators MG1, MG2, and it is possible to determine whether or not an insulation abnormality has occurred in a region outside the battery area AR1.

The relay SMRB on the positive electrode side, from among the relays SMRB, SMRG (SMRP) of the SMR 40, is switched ON because when the relay SMRB is switched ON, the output of the detector 42 is stabilized faster than in the case where the relay SMRG (SMRP) on the negative electrode side is switched ON. Specifically, where only either of the relays SMRB, SMRG (SMRP) is switched ON, the power does not flow from the power storage device B to the positive electrode line PL1 and the negative electrode line NL. Meanwhile, the voltage level of the power storage device B varies with respect to the ground voltage (the voltage between the electrodes does not change). As a result, the state of charge of the capacitor 63 (FIG. 2) of the detector 42 varies and the output of the detector 42 changes temporarily. The time required for such changes to converge is shorter when the relay SMRB on the positive electrode side is switched ON. For this reason, in this embodiment, the relay SMRB on the positive electrode side is switched ON. However, the pre-charge processing is also unnecessary when only the relay SMRG (SMRP) on the negative electrode side is switched ON. Therefore, the SMR check processing time can be greatly reduced by comparison with the case when the relays on both electrode sides of the SMR 40 are switched ON.

Further, in the SMR check, the SMR 40 is switched OFF as the vehicle system is stopped, the relay SMRB is then again switched ON and variations in the detection value (voltage value Vk) of the detector 42 are checked. Therefore, the operation power is supplied to the controller 30, detector 42, SMR 40, and the like so that the SMR check could be performed even after the vehicle system has been stopped.

Returning again to FIG. 4, the insulation decrease determination unit 38 determines whether or not an insulation abnormality (insulation decrease) has occurred in the DC area AR2, MG1 area AR3, or MG2 area AR4 on the basis of the voltage value Vk from the detector 42. This determination processing is implemented as the SMR 40 is ON (for example, immediately after the vehicle system has been started or immediately before the vehicle system is stopped). The determination processing can be also implemented when the relay SMRB is ON in the SMR check.

For example, the insulation decrease determination unit 38 determines whether or not an insulation abnormality has occurred in the DC area AR2 on the basis of the presence or absence of a decrease in the voltage value Vk when the switching element of the boost converter 12 is switched ON/OFF in a state in which all of the switching elements of the inverters 14, 22 are OFF. Further, the insulation decrease determination unit 38 determines whether or not an insulation abnormality has occurred in the MG1 area AR3 on the basis of the presence or absence of a decrease in the voltage value Vk when the switching element of the inverter 14 is switched ON/OFF. The insulation decrease determination unit 38 also determines whether or not an insulation abnormality has occurred in the MG2 area AR4 on the basis of the presence or absence of a decrease in the voltage value Vk when the switching element of the inverter 22 is switched ON/OFF. The insulation decrease determination unit 38 outputs the operation command of the boost converter 12 following the above-mentioned processing to the converter control unit 32, and outputs the operation command of the inverters 14, 22 following the above-mentioned processing to the inverter control unit 34.

Figure 7A:
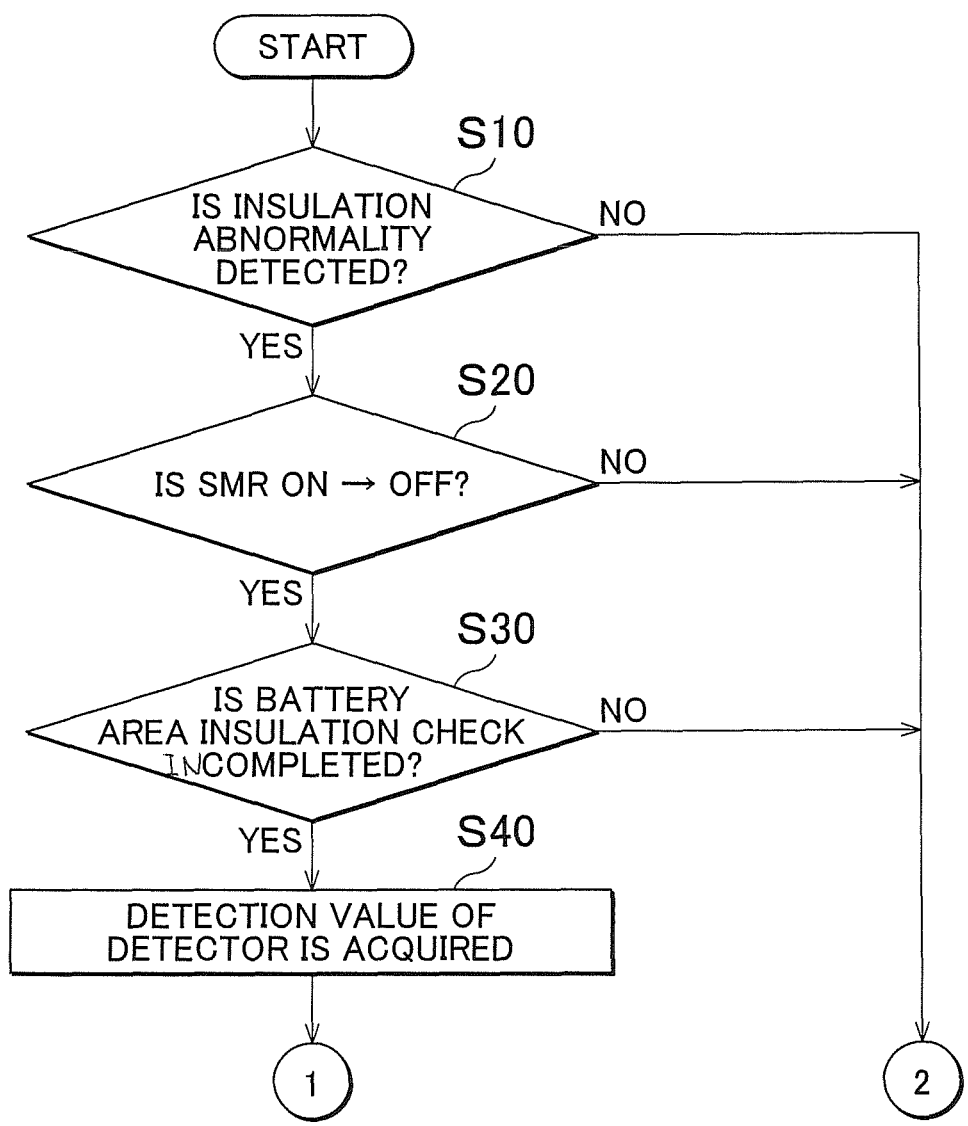
FIGS. 7A and 7B are flowcharts for explaining the processing sequence of SMR check executed by the controller of the embodiment.
Figure 7B:
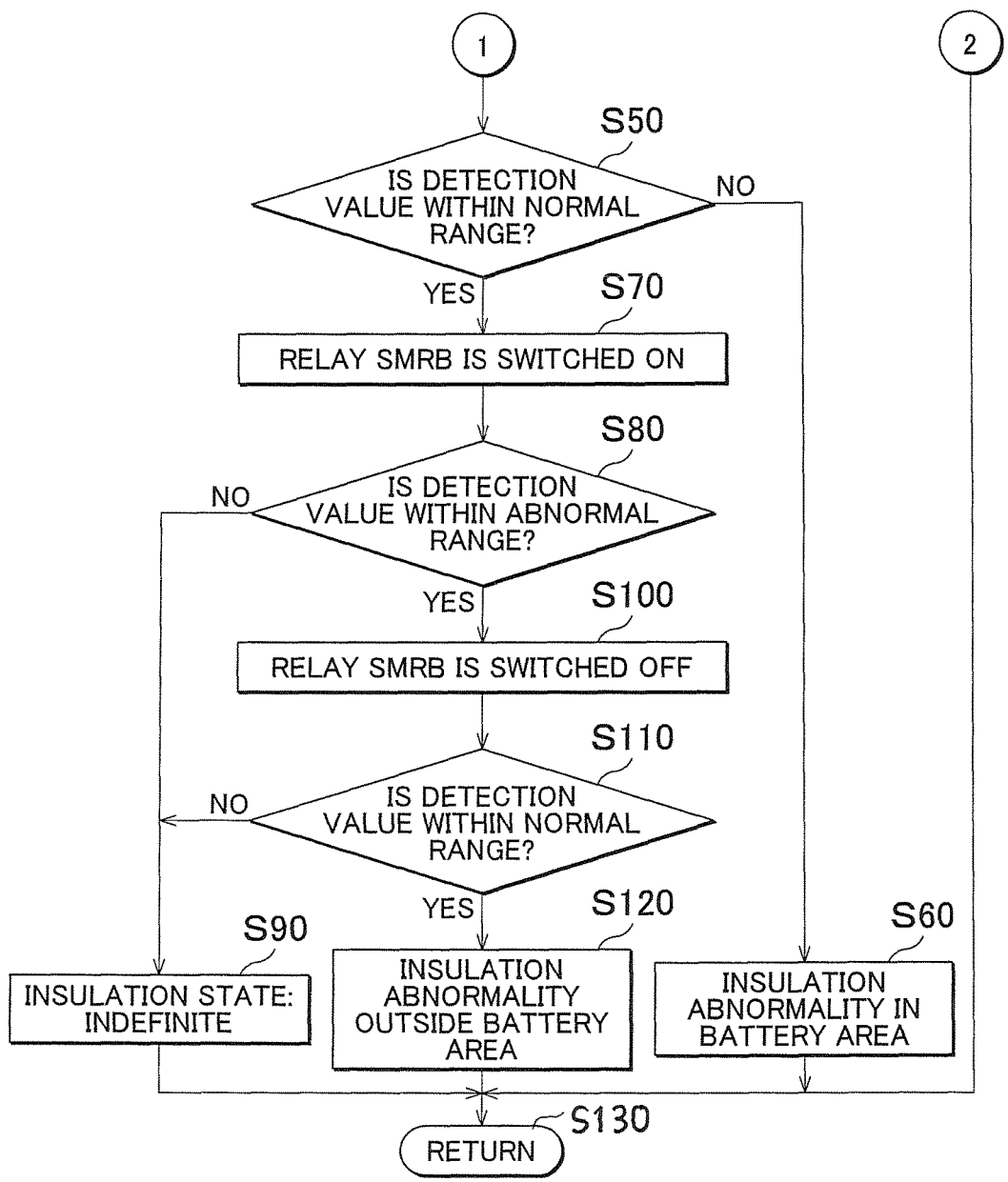

FIG. 7 is a flowchart for explaining the processing sequence of the SMR check executed by the controller 30. Each step in the flowchart is invoked from the main routine by the program, which has been stored in advance in the controller 30, and realized by executing in a predetermined period of time or each time a predetermined condition is fulfilled. Alternatively, the processing can be realized with respect to some or all of the steps by constructing special hardware (electronic circuit).

Referring to FIG. 7 and also FIG. 1, the controller 30 determines whether or not an insulation abnormality (insulation decrease) of the electric system has occurred on the basis of the voltage value Vk from the detector 42 (step S10). For example, an appropriate threshold is provided for the voltage value Vk and an insulation abnormality is detected when the voltage value Vk is below the threshold. When the insulation abnormality is not detected (NO in step S10), the controller 30 advances the processing to step S130, without executing the series of subsequent processing steps.

Where it is determined in step S10 that an insulation abnormality of the electric system has been detected (YES in step S10), the controller 30 determines whether or not the SMR 40 has been switched from the ON state to the OFF state (step S20). For example, when the ignition switch or start switch is operated OFF, the SMR 40 is switched from the ON state to the OFF state. Accordingly, in step S20, it may be determined whether or not the ignition switch or the start switch has been operated OFF, instead of checking the operation of the SMR 40.

The operation power is then supplied to the controller 30, the detector 42, the SMR 40, and the like so that subsequent processing could be executed even though the ignition switch or start switch has been switched OFF.

When the SMR 40 is in the ON state (NO in step S20), the processing is advanced to step S130. Where the SMR 40 is switched from the ON state to the OFF state (YES in step S20), the controller 30 determines whether or not the insulation check (SMR check) of the battery area AR1 is incomplete (S30). Where the insulation check of the battery area AR1 has already been completed (NO in step S30), the processing advances to step S130.

Where it is determined in step S30 that the insulation check of the battery area AR1 is incomplete (YES in step S30), the controller 30 acquires the voltage value Vk which is the detection value of the detector 42 (step S40). The controller 30 then determines whether or not the detection value is within the normal range (step S50). More specifically, where the voltage value Vk is greater than the threshold, it is determined that the detection value is within the normal range, and where the voltage value Vk is less than the threshold, it is determined that the detection value is within the abnormal range.

Where the voltage value Vk has decreased and it is determined that the detection value is within the abnormal range (NO in step S50), since the voltage value Vk has decreased despite the fact that the SMR 40 has been switched OFF and the regions AR2 to AR4 have been electrically disconnected from the detector 42 in step S20, the controller 30 determines that an insulation abnormality (insulation decrease) has occurred in the battery area AR1 (step S60).

Meanwhile, where it is determines in step S50 that the detection value is within the normal range (YES in step S50), the controller 30 switches ON only the relay SMRB on the positive electrode side of the SMR 40 (step S70). The controller 30 then determines whether or not the detection value of the detector 42 is within the abnormal range (step S80).

Where the voltage value Vk has not decreased although the relay SMRB is switched ON, and it is determined that the detection value is within the normal range (NO in step S80), it is impossible to determine that an insulation abnormality (insulation decrease) has occurred outside the battery area AR1 (that is, in the DC area AR2, MG1 area AR3, or MG2 area AR4), and the controller 30 determines that the insulation state of the electric system is "indefinite" (step S90). As a result, the erroneous determination that an insulation abnormality has occurred outside the battery area AR1 is avoided.

Meanwhile, where the voltage value Vk decreases because the relay SMRB is switched ON in step S70, and it is determined in step S80 that the detection value of the detector 42 is within the abnormal range (YES in step S80), the controller 30 switches OFF the relay SMRB (step S100). It is then determined again whether or not the detection value of the detector 42 is within the normal range (step S110), and where it is determined that the detection value is within the normal range (YES in step S110), the controller 30 determines that an insulation abnormality (insulation decrease) has occurred outside the battery area AR1 (step S120).

Where the voltage value Vk remains decreased although the relay SMRB is switched OFF in step S100, and it is determined that the detection value of the detector 42 is within the abnormal range (NO in step S110), the controller 30 advances the processing to step S90 and determines that the insulation state of the electric system is "indefinite".

The processing of step S110 is performed in a confirmatory manner when the relay SMRB is eventually switched OFF, and step S110 may be omitted.

As described hereinabove, in the present embodiment, the insulation state of the electric system is determined not only by using (1) the detection result (voltage value Vk) of the detector 42 obtained when the SMR 40 is switched OFF, but also by using (2) the detection result of the detector 42 obtained when only the relays SMRB is thereafter switched ON. As a result, the determination accuracy is increased by comparison with the case in which the insulation state is determined by using only the former detection result (1). Further, since only the relay SMRB is switched ON after the SMR 40 has been switched OFF, the pre-charge processing, discharge processing, and relay fusion check that should be executed when the relays of both electrodes are switched ON are unnecessary. Therefore, with this embodiment, it is possible to improve the insulation abnormality determination accuracy and also shorten the processing time.

Further, according to the embodiment, since the relay SMRB on the positive electrode side is switched ON after the SMR 40 has been switched OFF, the SMR check time can be shortened by comparison with that when the relay SMRG (or SMRP) on the negative electrode side is switched ON. Even when the relay SMRG (or SMRP) on the negative electrode side is switched ON, the time interval required for the SMR check can be greatly shortened by comparison with the case in which the relays of both electrodes are switched ON.

Further, in the above-described embodiment, the detector 42 is electrically connected to the negative electrode side of the power storage device B, but the detector 42 may be connected to the positive electrode side of the power storage device B. In the SMR 40, the relay SMRP and the resistor R are provided on the negative electrode side, but the relays SMRP and the resistor R may be provided on the positive electrode side.

Further, in the above-described embodiment, the electric system is provided with the boost converter 12, but the invention can be also applied to a vehicle that carries an electric system including no boost converter 12. The electric system may be further provided, for example, with an electric air conditioner and an inverter for driving the same.

In the above-described embodiment, the electric vehicle is a hybrid vehicle equipped with the engine 4, but the application range of the invention is not limited to the hybrid vehicles such as described hereinabove and includes electric automobiles including no engine, and fuel cell vehicles further equipped with a fuel cells as an energy source.

In the explanation above, the boost converter 12, inverters 14, 22, and motor generators MG1, MG2 form an example of the "drive device" of the invention, and the relays SMRB of the SMR 40 corresponds to an example of the "first relay" of the invention. The relay SMRG or relay SMRP of the SMR 40 corresponds to an example of the "second relay" of the invention.

The embodiments disclosed herein are exemplary and should not be construed as limiting in any way. The scope of the invention is defined by the claims, rather than by the above-described embodiments, and is intended to include equivalents to the scope of the claims and all variations within the scope of the claims.

What is claimed is:

1. An electric vehicle comprising:
   an electric system configured to generate drive power, the electric system comprising:
      a power storage device;
      a drive device configured to use power of the power storage device to generate drive power;
      a first relay provided between a positive electrode of the power storage device and the drive device; and
      a second relay provided between a negative electrode of the power storage device and the drive device;
   a detector configured to detect an insulation abnormality in the electric system, the detector being electrically connected to the power storage device; and
   a controller configured to:
      open the first relay and the second relay;
      close only one of the first relay and the second relay after the first relay and the second relay have been opened;
      determine an insulation state of the electric system on the basis of a detection result of the detector obtained when the first relay and the second relay are open and a detection result of the detector obtained when only one of the first relay and the second relay is thereafter closed; and determine that the insulation state of the electric system is indefinite when opening of the first relay and the second relay changes a detection result of the detector from abnormal to normal and the detection result of the detector indicates a normal state even when only one of the first relay and the second relay is thereafter closed.

2. The electric vehicle according to claim 1, wherein the controller is configured to determine the insulation state of the electric system on the basis of the detection result of the detector obtained when the first relay and the second relay are open and the detection result of the detector obtained when the first relay is thereafter closed.

3. The electric vehicle according to claim 1, wherein the controller is configured to determine that an insulation resistance of the drive device has decreased when opening of the first relay and the second relay changes a detection result of the detector from abnormal to normal and the detection result of the detector indicates an abnormal state as a result of only one of the first relay and the second relay being thereafter closed.

4. The electric vehicle according to claim 1, wherein the controller is configured to determine that an insulation resistance of the power storage device has decreased when a detection result of the detector indicates an abnormal state when the first relay and the second relay are open.

5. The electric vehicle according to claim 1, wherein the detector comprises:
a resistor element;
an AC power source configured to generate an AC voltage having a predetermined frequency;
a capacitor electrically connected between the resistor element and the power storage device; and
a voltage detection unit configured to detect a voltage component having the predetermined frequency in the power line between the resistor element and the capacitor,
the AC power source being electrically connected between the resistor element and a vehicle ground.

6. An insulation state determination method for an electric vehicle, comprising:
detecting with a detector an insulation abnormality of an electric system that generates drive power;
opening a first relay provided between a positive electrode of a power storage device and a drive device, and opening a second relay provided between a negative electrode of the power storage device and the drive device;
closing only one of the first relay and the second relay after the first relay and the second relay have been opened;
determining an insulation state of the electric system on the basis of a detection result of the detector obtained when the first relay and the second relay are open, and a detection result of the detector obtained when only one of the first relay and the second relay is closed; and
determining that the insulation state of the electric system is indefinite when opening of the first relay and the second relay changes a detection result of the detector from abnormal to normal and the detection result of the detector indicates a normal state even when only one of the first relay and the second relay is thereafter closed.

7. The insulation state determination method according to claim 6, wherein
the insulation state of the electric system is determined on the basis of the detection result of the detector obtained when the first relay and the second relay are open and the detection result of the detector obtained when the first relay is closed.

8. A vehicle comprising:
an electric system configured to generate drive power, the electric system comprising:
a power storage device;
a drive device configured to use power of the power storage device to generate drive power;
a first relay provided between a positive electrode of the power storage device and the drive device; and
a second relay provided between a negative electrode of the power storage device and the drive device;
a detector configured to detect an insulation abnormality in the electric system, the detector being electrically connected to the power storage device; and
a controller configured to:
open the first relay and the second relay;
close only the first relay after the first relay and the second relay have been opened such that the first relay is closed and the second relay is open;
determine an insulation state of the electric system on the basis of: (i) a first detection result of the detector obtained when the first relay and the second relay are open; and (ii) a second detection result of the detector obtained when the first relay is closed and the second relay is open; and
determine that the insulation state of the electric system is indefinite when opening of the first relay and the second relay changes a detection result of the detector from abnormal to normal and the detection result of the detector indicates a normal state even when only the first relay is thereafter closed.

9. The vehicle according to claim 8, wherein
the controller is configured to determine that an insulation resistance of the drive device has decreased when opening of the first relay and the second relay changes a detection result of the detector from abnormal to normal and the detection result of the detector indicates an abnormal state as a result of only the first relay being thereafter closed.

10. The vehicle according to claim 8, wherein
the controller is configured to determine that an insulation resistance of the power storage device has decreased when a detection result of the detector indicates an abnormal state when the first relay and the second relay are open.

11. The vehicle according to claim 8, wherein
the detector comprises:
a resistor element;
an AC power source configured to generate an AC voltage having a predetermined frequency;
a capacitor electrically connected between the resistor element and the power storage device; and
a voltage detection unit configured to detect a voltage component having the predetermined frequency in the power line between the resistor element and the capacitor,
the AC power source being electrically connected between the resistor element and a vehicle ground.

* * * * *